(12) United States Patent
Kron

(10) Patent No.: US 11,731,710 B2
(45) Date of Patent: Aug. 22, 2023

(54) AXLE-MOUNTED DIFFUSERS FOR FREIGHT VEHICLES

(71) Applicant: Steven Todd Kron, Pewaukee, WI (US)

(72) Inventor: Steven Todd Kron, Pewaukee, WI (US)

(73) Assignee: Steven Todd Kron, Pewaukee, WI (US)

( * ) Notice: Subject to any disclaimer, the term of this patent is extended or adjusted under 35 U.S.C. 154(b) by 184 days.

(21) Appl. No.: 17/083,291

(22) Filed: Apr. 22, 2021

(65) Prior Publication Data

US 2021/0347417 A1 Nov. 11, 2021

Related U.S. Application Data

(60) Provisional application No. 62/973,808, filed on Oct. 28, 2019.

(51) Int. Cl.
*B62D 35/02* (2006.01)
*B62D 35/00* (2006.01)

(52) U.S. Cl.
CPC ........... *B62D 35/02* (2013.01); *B62D 35/001* (2013.01)

(58) Field of Classification Search
CPC ....... B62D 35/001; B62D 35/02; Y02T 10/82; Y02T 10/88
See application file for complete search history.

(56) References Cited

U.S. PATENT DOCUMENTS

| | | | |
|---|---|---|---|
| 2011/0272964 A1* | 11/2011 | Henderson | B62D 35/007 296/180.4 |
| 2019/0337577 A1* | 11/2019 | Del Gaizo | B62D 35/007 |
| 2020/0239088 A1* | 7/2020 | Kapetanovic | B62D 35/001 |
| 2020/0385070 A1* | 12/2020 | Cattell | B62D 37/02 |

* cited by examiner

Primary Examiner — Lori Lyjak

(57) ABSTRACT

The purpose of this device is to reduce the fuel consumption of heavy trucks by improving airflow past trailer axles. Rather than restrict airflow to the side of the vehicle, diffusers streamline its aerodynamic profile and allow air to flow smoothly beneath. A series of panels mounted to each axle of a truck and trailer forms a substantially continuous surface from the front to the rear axle, promoting laminar flow to the aft of the vehicle, minimizing the effect of suction drag.

12 Claims, 9 Drawing Sheets

AXLE-MOUNTED DIFFUSERS FOR FREIGHT VEHICLES

BACKGROUND OF THE INVENTION

Of the factors influencing the fuel economy of semi-trucks, aerodynamics is the field which produces the most practical and profitable improvements. Of the two types of aerodynamic drag—friction and pressure—pressure drag has a particularly significant impact on heavy trucks, accounting for as much as 90% of drag force.

On a standard unmodified tractor-trailer, approximately one third of this pressure drag is caused by the vehicle undercarriage. When the elements which cause drag are essential structural components, they cannot be removed, displaced, or dramatically altered. Instead, aerodynamic fairings can be attached to the vehicle to improve airflow, thereby reducing drag and consequently fuel consumption.

A trailer suspension system is engineered for a smooth ride but is prohibitive to stable airflow. The tires, axles, beams, springs, hoses, and canisters which hang from the suspension all present aerodynamic obstructions. Closing or otherwise covering these gaps would transform the uneven underside of the trailer into a smooth, flat surface, improving aerodynamic efficiency and minimizing turbulence.

The standard approach to this problem has been to keep air alongside the vehicle, away from obstructions in the undercarriage. While side skirts address this problem reasonably well, they exacerbate the primary deficiency of a freight vehicle—that it is a large box creating a turbulent vacuum in its wake. Whereas side skirts increase the size of this vacuum, these diffusers will help streamline the profile of a trailer and fill this vacuum with stable airflow.

SUMMARY OF THE INVENTION

Figure 1:
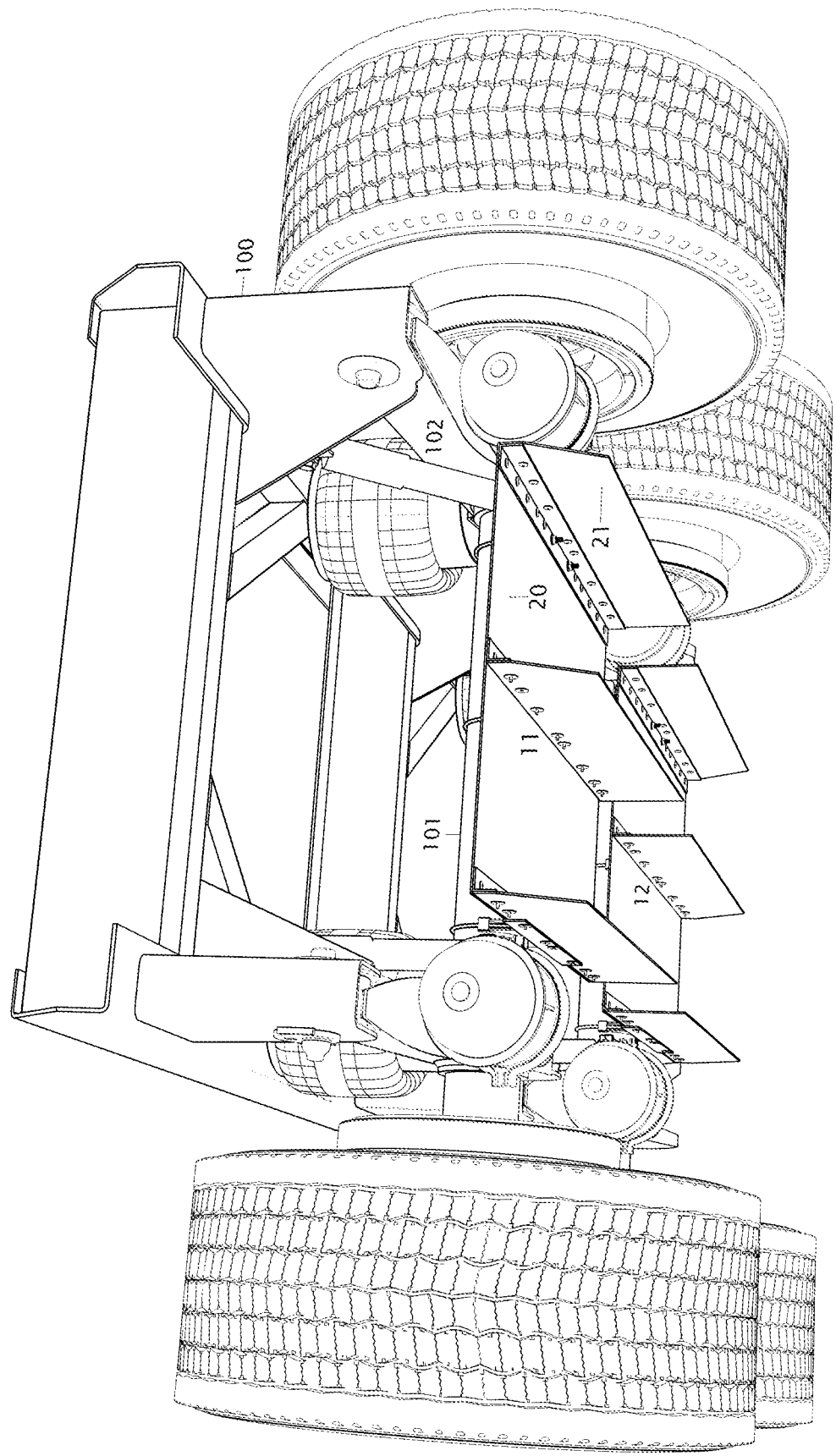
FIG. 1. Perspective view of beneath tandem axles with independently mounted diffusers.
Figure 2:
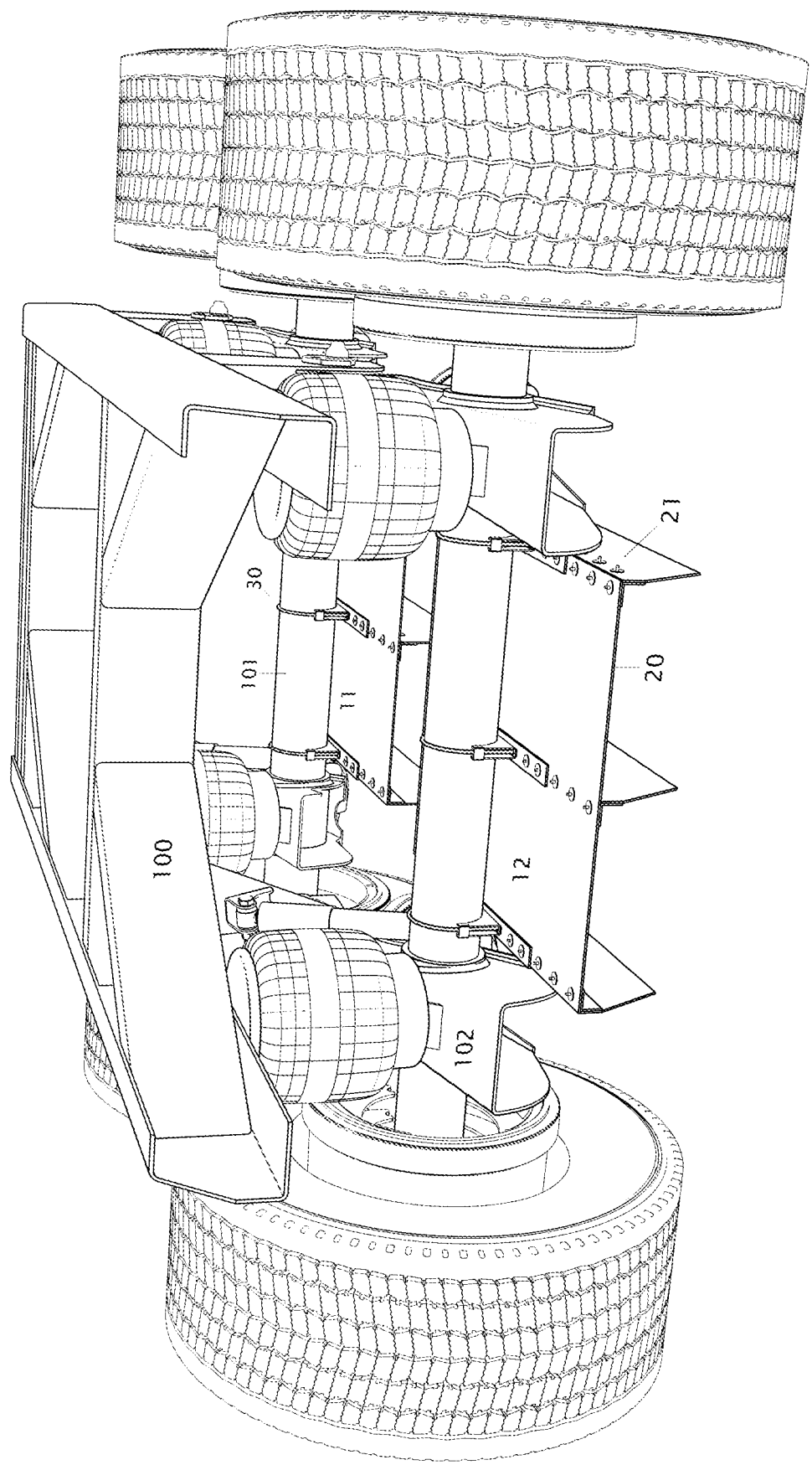
FIG. 2. Perspective view of the axle diffusers, as seen from the rear of the vehicle.
Figure 3A:
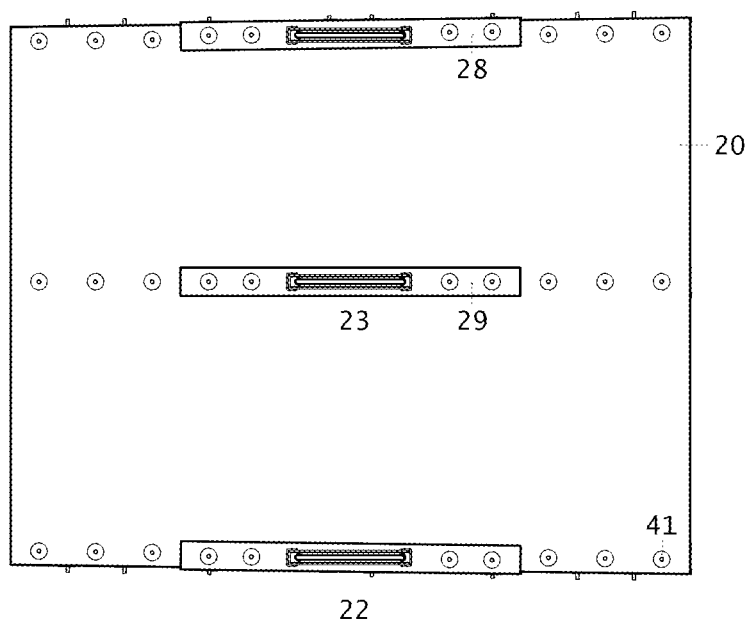
FIG. 3. Orthographic views of the diffuser, as seen from the top (A), side (B), and bottom (C).
Figure 3B:
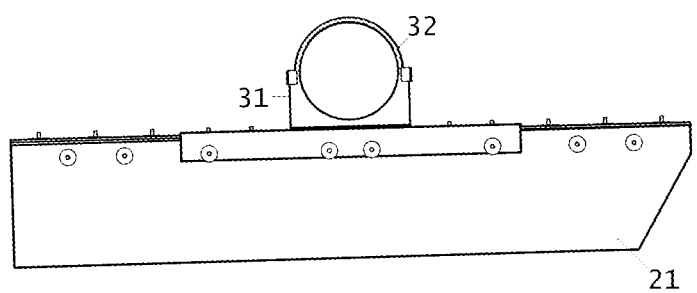
Figure 3C:
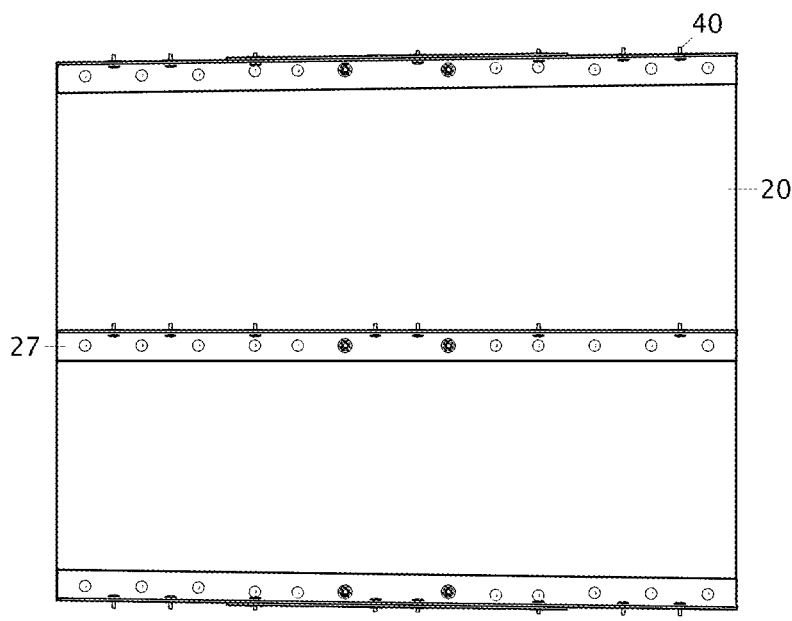
Figure 4:
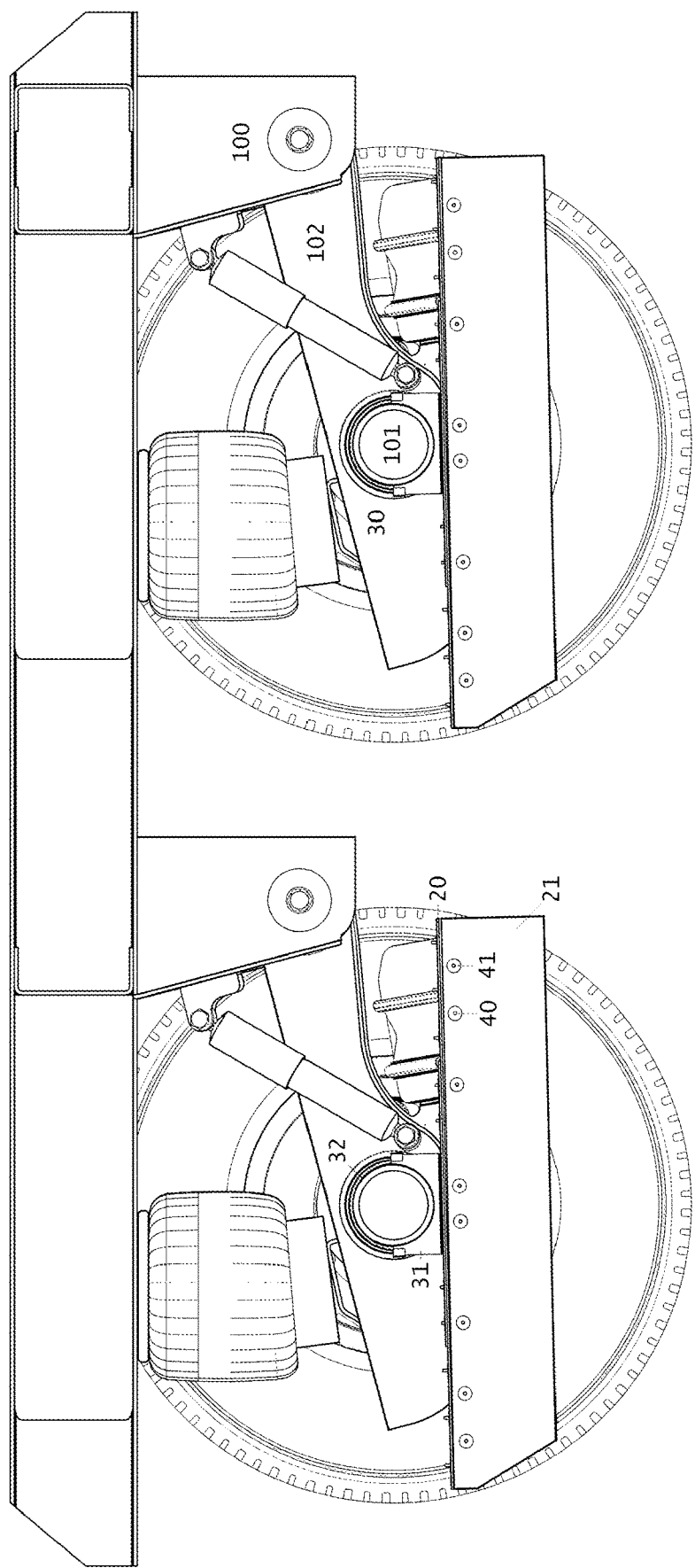
FIG. 4. Top view of a sliding suspension system with axle-mounted diffusers.
Figure 5:
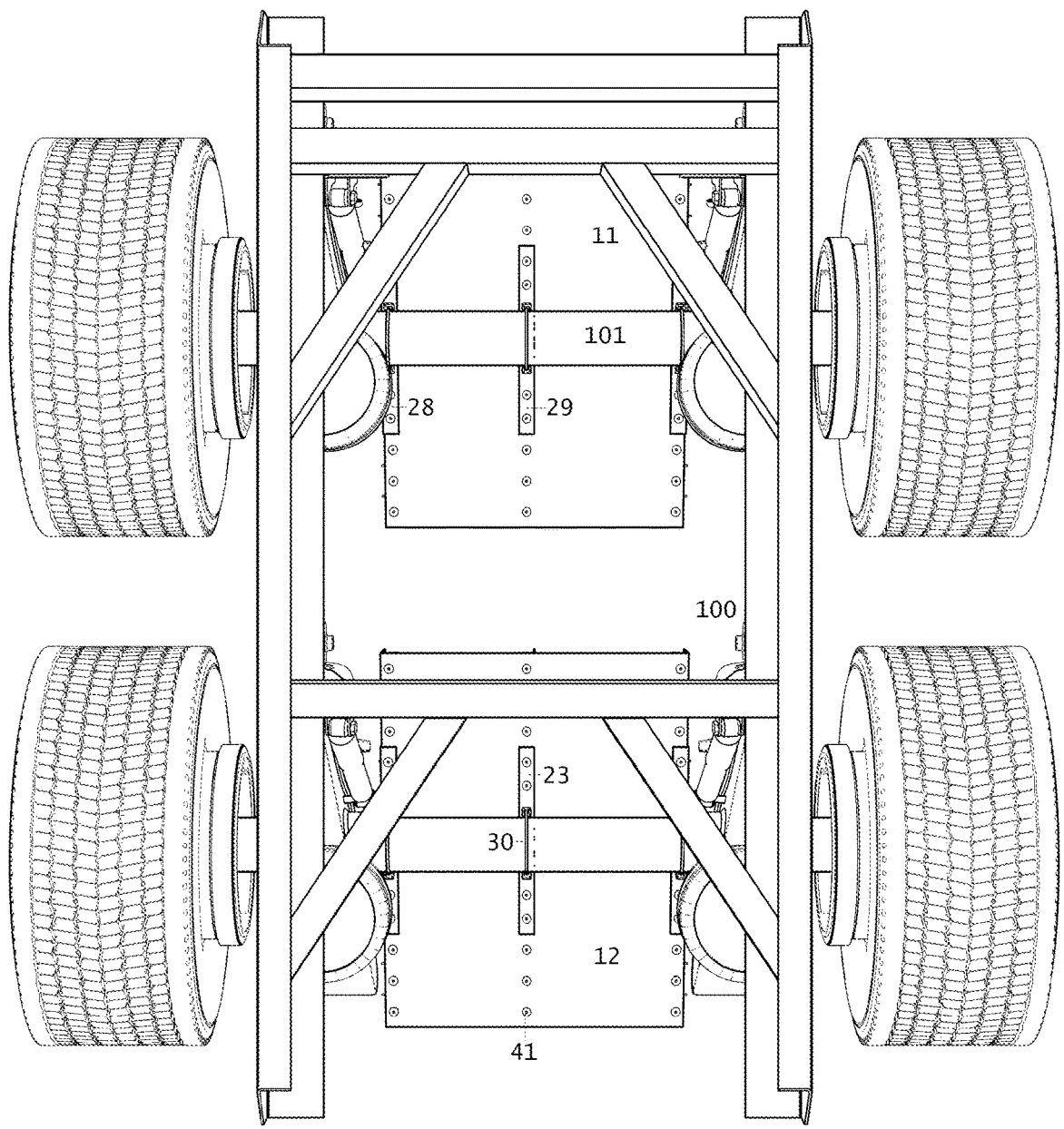
FIG. 5. Bottom view of a sliding suspension system with axle-mounted diffusers.
Figure 6:
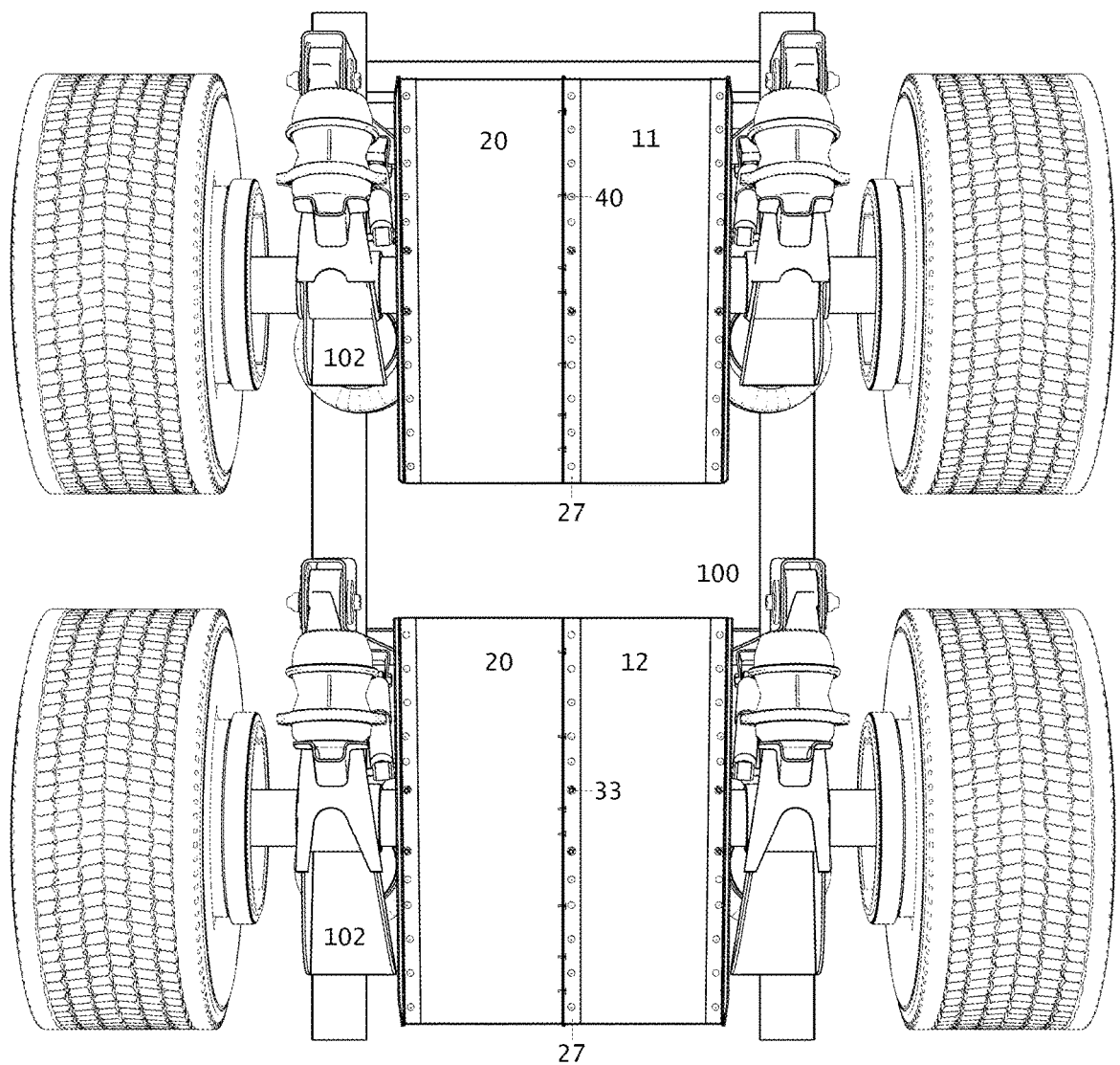
FIG. 6. Cross-section of a sliding suspension system with axle-mounted diffusers.
Figure 7:
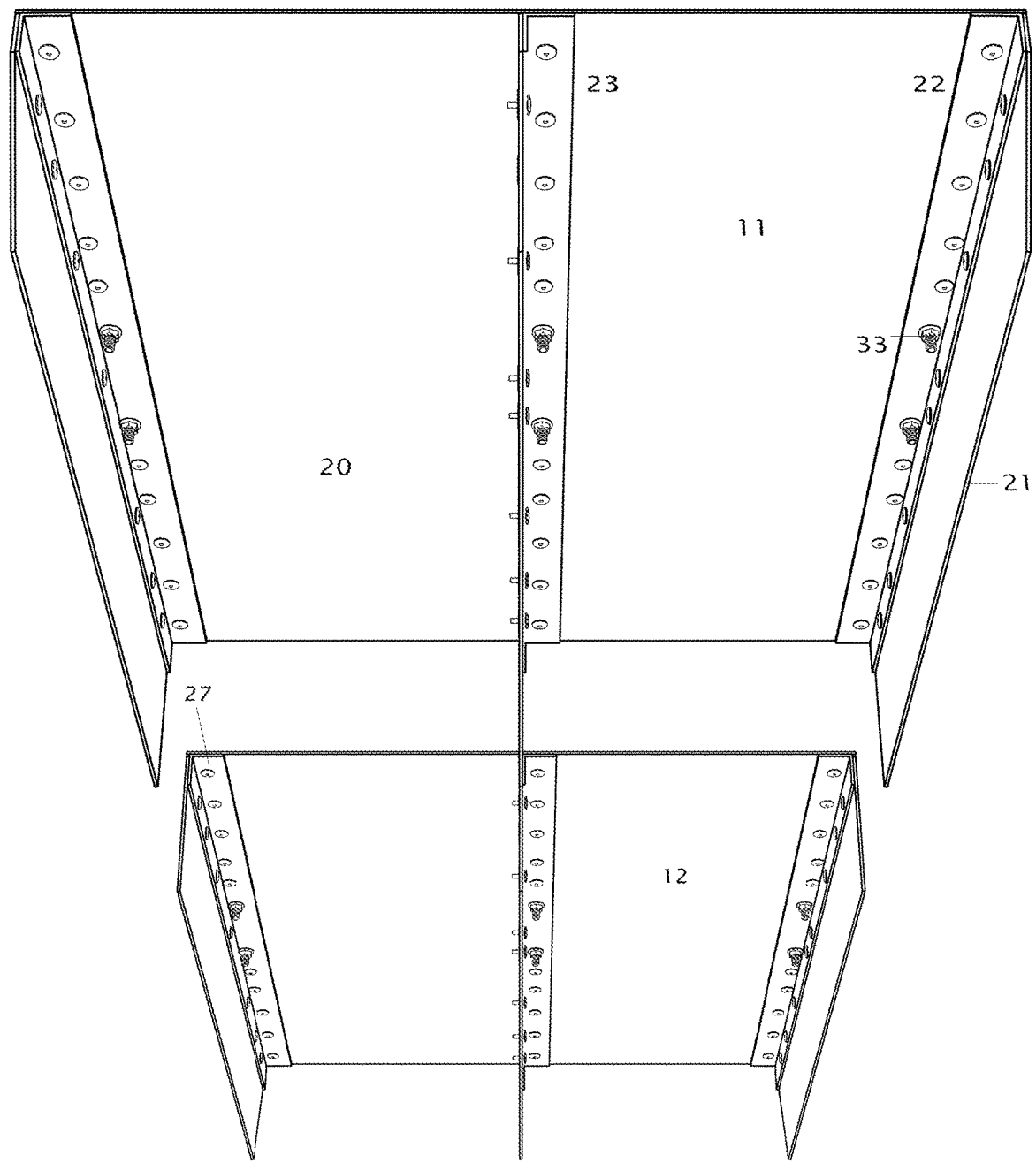
FIG. 7. Perspective view of a diffuser pair, as seen from below the axles.
Figure 8:
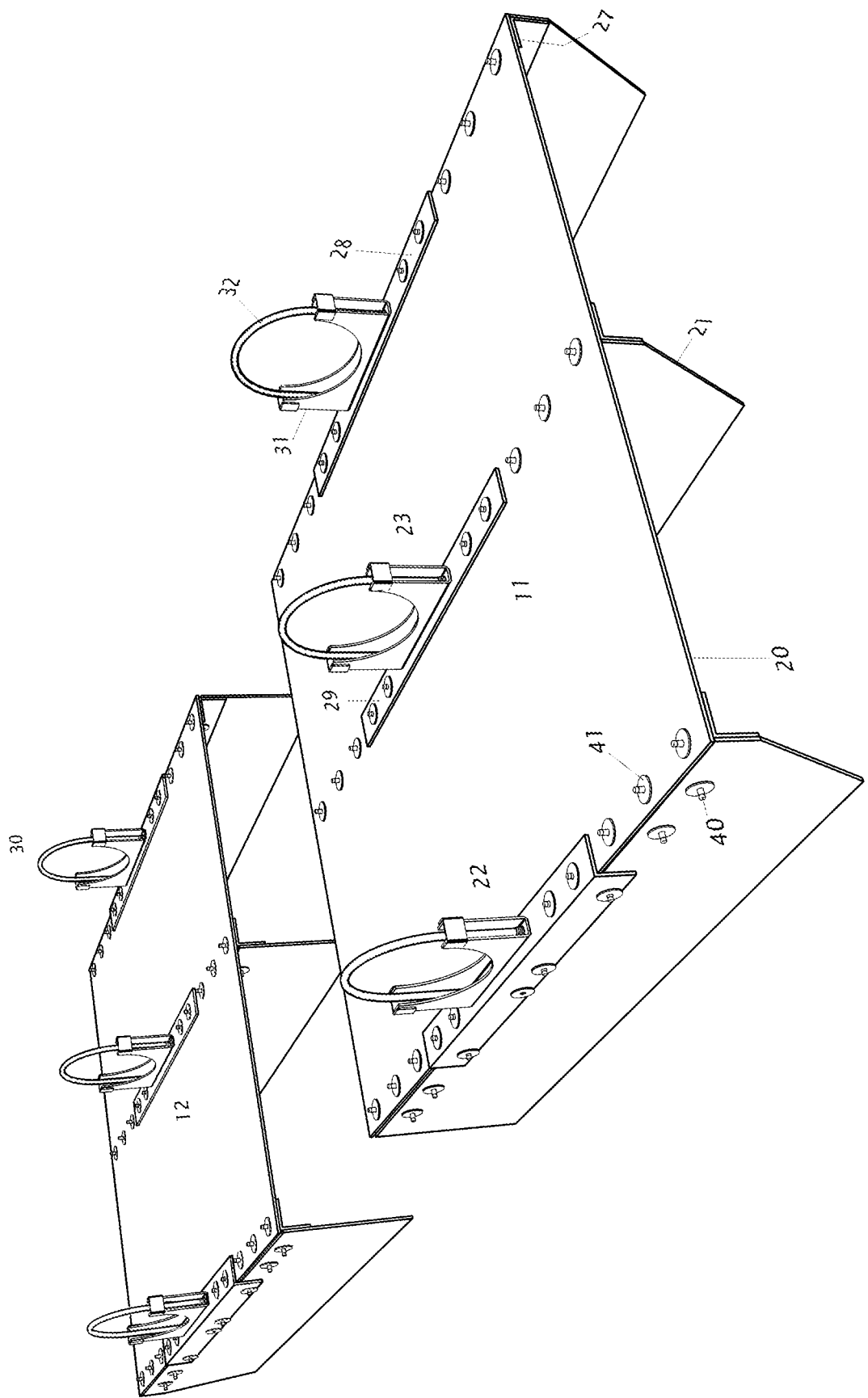
FIG. 8. Perspective view of the axle diffusers, unmounted but fully assembled.
Figure 9:
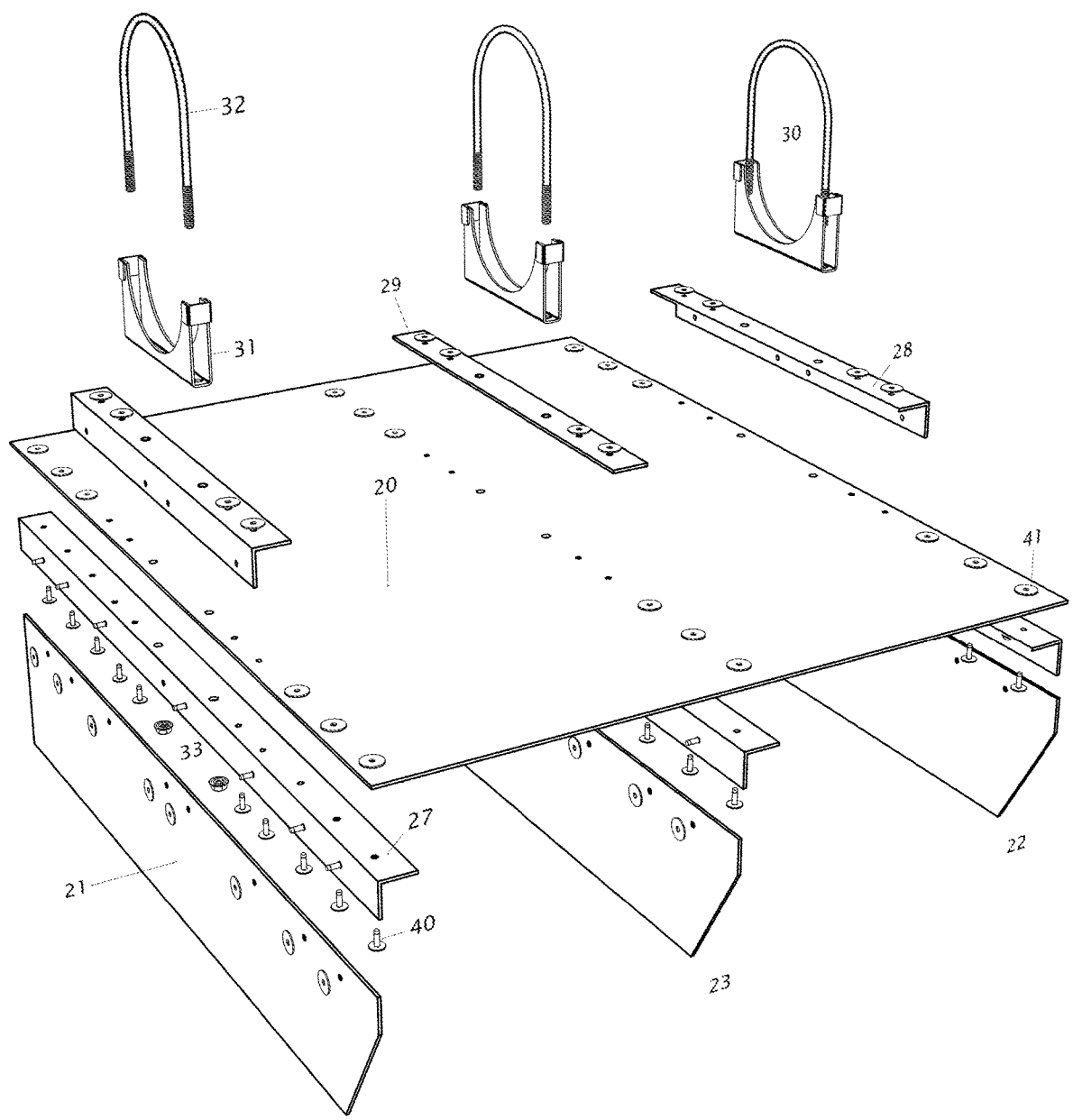
FIG. 9. Exploded view of a single axle diffuser.

The invention consists of a series of panels mounted to the axles of trucks and trailers. While they are mounted independently of one another, with a gap in between, they form a substantially continuous surface from the front to the rear axle. This allows air to flow smoothly beneath the axles, with as much as a third of the air which would be obstructed by side skirts instead filling the vacuum to the rear of the trailer, mitigating a major deficiency of the present approach.

These diffusers comprise a main horizontal panel and a plurality of vertical panels. The horizontal panel spans the width between the suspension beams, creating a smooth surface beneath the axle. On either side there is a vertical panel which limits airflow to the space beneath this smooth surface and prevents it from escaping outward where it would create turbulence and increase drag. These vertical panels, known as strakes, are designed to channel airflow. There is an additional strake in the center, bisecting this volume of air and further promoting stable, directional flow.

DETAILED DESCRIPTION OF THE PREFERRED EMBODIMENT

The preferred embodiment consists of a separate diffusers 11 and 12 mounted to each axle of a semi-trailer. The primary material of the diffuse is directionally flexible fiberglass composite, cut to form a large horizontal panel 20 and a series of smaller vertical panels 21. This material is very resilient and, as currently constituted, the diffusers have withstood well over 100,000 miles of road testing.

Along with this material, these diffusers owe their durability to secure mounting, allowing them to move in conjunction with one axle of the tandem slider suspension 100 and independently of the other. Rather than span the gap between tandem axles or link two surfaces with a complicated mechanical connection, it is preferable to keep the diffusers 11 and 12 separate. Either diffuser can move up or down without causing undue stress on the adjacent diffuser. While the gap in between adjacent edges could be reduced or covered, it is essential for the long-term durability of the axle diffuser that it not be forced to move with any component other than the axle itself.

The main body of the diffuser 10 is a horizontal panel 20 measuring 36 inches long and less than 30 inches wide. Its leading edge measures 29.5 inches and its trailing edge measures 28.5 inches. These specific numbers are determined by the available space across the axle between the suspension beams 102, as well as the clearance which must be afforded to shock absorbers and brake canisters. This embodiment was tailored to the ubiquitous Hendrickson VANTRAAX sliding suspension system with tapered beams. With more or less available space these widths should be modified accordingly.

This large horizontal panel 20 is secured to an axle via muffler clamps 30, designed to mount to a cylindrical object of equal diameter. A clamp comprises two main components, a U bolt 32 and a U bracket 31, which fit snugly around the axle. The U bolt fits over the topside of the axle while the U bracket fits along the underside. Fastened together with a nut 33 on either end of the U bolt 32, the clamp is secured around the axle the axle 101. Placed between the nut 33 and bracket 31, the body of the diffuser can be mounted in place. A plurality of clamps further strengthens this connection.

These clamps also help secure strakes to the main body of the diffuser. Cut from the same directionally flexible fiberglass composite as the main horizontal panel, strakes 21 protrude vertically from the underside of the diffuser and along the entirety of its length. Each U bracket 31 is welded to a steel angle 28. Centered on the U bracket, the steel angle extends half the length of the strake. This strake is riveted to an aluminum angle 27 that extends the full length of the diffuser. When fastened via the U bolt 32, the strake 21 is sandwiched between the aluminum angle 27 and the steel angle 28. Rivets 40 strengthen and backing plates 41 fully fasten this assembly and secure the vertical strakes to the horizontal panel.

Not only do these metal angles secure the strakes to the main body of the diffuser, they strengthen its overall structure, preventing its directionally flexible fiberglass material from wobbling and flexing to the point of cracking. In general, this material are resistant to damage, but especially as it is engineered to bend in one direction along its grain. Taking this into account, the grain should be oriented perpendicular to the strakes and parallel to the axle, so that it may better resist strain. Metal reinforcements 27, 28, and 29 provide great strength in the opposite direction, but fastened parallel to the grain align a series of weak points where the fiberglass panel will crack. The most important consideration regarding the implementation of this material is to accommodate for the flexing of the axle. With the grain oriented incorrectly, this intense stress would most certainly cause damage, but with its grain parallel to the axle the fiberglass composite exhibits the requisite flexibility.

Each strake sub-assembly exhibits roughly this same construction, but structural requirements necessitate minor differences and the medial strake 23 has a different component and configuration than the lateral strakes 22. In particular, the center U bracket 31 is not welded to a steel angle 28, but a steel strip 29 which fits flat on the top surface of the horizontal panel 20 rather than overlap its edge. Because the aluminum angle 27 to which this assembly is connected offsets the position of the vertical panel, the clamp is positioned accordingly off-center so that the medial strake 23 is aligned to the exact middle.

The lateral strakes 22, following the edge of the horizontal panel, are not perfectly parallel to the other or to the medial strake 23. They exhibit a minor angle—less than one degree—inward toward the rear of the diffuser. While most of the connections in this embodiment form right angles, these minor deviations accommodate the restrictions of the suspension system and improve the aerodynamics of tandem diffusers.

On one level, the slight inward angle of these strakes is a function of tapered suspension beams. They are narrower in the front and wider in the back, leaving incrementally less width for the diffuser as it extends backward. The added benefit of this narrowing is to moderately compress the airflow volume and direct it towards the next diffuser in advance of the gap in between. As the aft cross-section of one diffuser is smaller than the forward cross-section of the next, this keeps more airflow beneath the fairings.

Rather than mount the diffusers parallel to the ground, they are angled so that the leading edge is approximately one inch higher than the trailing edge, resulting in a downward angle of approximately 1.5 degrees. This is intended to keep air beneath the axle and bumper once it flows past a diffuser, even as the height of either axle varies in relation to the other. Tilting the diffuser backward also increases the initial area of airflow, as the height of the leading edge is raised from 15 inches to 15.5. While this 3% increase in air volume may seem negligible, you will not maximize fuel economy by neglecting minor benefits. However, greater angles would not be advisable, since they could cause counterproductive air resistance.

The other angled component is the leading edge of the strakes 21 on the forward diffuser 11. This cut, made to 30 degrees, is to facilitate debris to pass underneath without getting caught or causing damage to the strakes. It may also allow air to better channel inward from the sides of the vehicle. The rearward strakes 21 on aft diffuser 22 are oppositely angled for an alternate purpose, so that air depressurizes less abruptly as it flows free of the diffusers. Where there is a gap between tandem diffusers, the edge of these strakes are to be straight up and down to provide the maximum interface between the separate surfaces.

What is claimed is:

1. A suspension-mounted diffuser for a freight vehicle comprising:
    a horizontal surface beneath an undercarriage of said freight vehicle; and
    a plurality of vertical surfaces, wherein said vertical surfaces protrude below said horizontal surface;
    wherein said diffuser is fixedly mounted beneath an axle of said freight vehicle such that said diffuser is rotatably attached to a suspension system in conjunction with said axle.
2. The suspension-mounted diffuser of claim 1, wherein one said suspension-mounted diffuser is independently mounted beneath each said axle of said freight vehicle.
3. The suspension-mounted diffuser of claim 1, wherein said suspension-mounted diffuser is fixedly mounted to said axle with a plurality of clamps.
4. The clamps of claim 3, wherein said clamps comprise a circular clamping surface and a flat mounting surface and wherein said circular clamping surface is of equal diameter to said axle.
5. The clamps of claim 4, wherein said circular clamping surface comprises a U bolt and a U bracket.
6. The suspension-mounted diffuser of claim 3, wherein said clamps are attached directly to said horizontal surface.
7. The suspension-mounted diffuser of claim 3, wherein said clamps are welded to metal reinforcement comprising at least one substantially flat surface at least half the length of said horizontal surface.
8. The vertical surfaces of claim 1, wherein each of said vertical surfaces are equal in length to said horizontal surface and wherein each of said vertical surfaces is mounted to a metal angle of the same length.
9. The vertical surfaces of claim 8, wherein said plurality of vertical surfaces is secured to said horizontal surface and said axle via said clamps.
10. The suspension-mounted diffuser of claim 1, wherein said horizontal surface is composed of directionally flexible fiber-reinforced plastic using glass fiber, and wherein the directional flexibility of said fiber-reinforced plastic using glass fiber is oriented parallel to said axle.
11. The suspension-mounted diffuser of claim 1, wherein said plurality of vertical surfaces is composed of directionally flexible fiber-reinforced plastic using glass fiber.
12. The suspension-mounted diffuser of claim 1, wherein said horizontal surface is angled downward such that a leading edge is higher than a trailing edge, and where said plurality of vertical surfaces is angled inward such that said leading edge is wider than said trailing edge of said suspension-mounted diffuser.

* * * * *